US011241977B1

(12) United States Patent
Wiesenberg et al.

(10) Patent No.: US 11,241,977 B1
(45) Date of Patent: Feb. 8, 2022

(54) SYSTEMS AND METHODS FOR DETERMINING THE PRESENCE OF OCCUPANTS LEFT BEHIND IN A VEHICLE

(71) Applicant: TOYOTA MOTOR NORTH AMERICA, INC., Plano, TX (US)

(72) Inventors: Ryan M. Wiesenberg, Ann Arbor, MI (US); Ethan W. Pomish, Livonia, MI (US)

(73) Assignee: Toyota Motor North America, Inc., Plano, TX (US)

( * ) Notice: Subject to any disclaimer, the term of this patent is extended or adjusted under 35 U.S.C. 154(b) by 0 days.

(21) Appl. No.: 17/068,276

(22) Filed: Oct. 12, 2020

(51) Int. Cl.
G08B 23/00 (2006.01)
B60N 2/00 (2006.01)
G08B 21/18 (2006.01)
G08B 21/22 (2006.01)

(52) U.S. Cl.
CPC ........... B60N 2/002 (2013.01); G08B 21/182 (2013.01); G08B 21/22 (2013.01)

(58) Field of Classification Search
CPC ....... B60N 2/002; G08B 21/182; G08B 21/22
USPC ...................................... 340/573.1
See application file for complete search history.

(56) References Cited

U.S. PATENT DOCUMENTS

| 6,509,653 | B2* | 1/2003 | Fujimoto | .......... B60R 21/01516 |
| | | | | 180/273 |
| 7,170,401 | B1* | 1/2007 | Cole | ..................... B60N 2/002 |
| | | | | 340/439 |
| 7,445,079 | B2 | 11/2008 | Biallas | |
| 9,676,325 | B1* | 6/2017 | Duan | ..................... B60N 2/002 |
| 9,925,840 | B2 | 3/2018 | O'Amato et al. | |
| 10,343,658 | B2 | 7/2019 | Tober | |
| 2002/0024257 | A1* | 2/2002 | Fujimoto | .......... B60R 21/01556 |
| | | | | 307/10.1 |
| 2003/0105570 | A1* | 6/2003 | Basir | ................ B60R 21/01556 |
| | | | | 701/45 |
| 2003/0158644 | A1* | 8/2003 | Basson | ............ G08B 13/19697 |
| | | | | 701/49 |
| 2004/0041389 | A1* | 3/2004 | Nishide | .................. B60N 2/002 |
| | | | | 280/801.1 |

(Continued)

FOREIGN PATENT DOCUMENTS

| CN | 1796166 A | 7/2006 |
| CN | 109000770 A | 12/2018 |

(Continued)

*Primary Examiner* — Zhen Y Wu
(74) *Attorney, Agent, or Firm* — Dinsmore & Shohl, LLP (57) ABSTRACT

Vehicle sensing systems and methods of sensing a potential presence of an occupant left behind in a vehicle are disclosed. A vehicle sensing system includes sensors to detect a ride height or camber positioning, a processing device, and storage medium including programming instructions that, when executed, cause the processing device to obtain a first string of data from the sensors before a driver has entered the vehicle and the vehicle has been turned on, obtain a second string of data from the sensors after the vehicle has moved a distance, the vehicle has been turned off, and the driver has departed from a vicinity of the vehicle, compare the first string of data to the second string of data to determine if a difference exists, and when the difference exists, transmit an alert to external devices, the alert indicating a potential occupant being left behind in the vehicle.

10 Claims, 3 Drawing Sheets

(56) References Cited

U.S. PATENT DOCUMENTS

| | | | |
|---|---|---|---|
| 2004/0045759 A1* | 3/2004 | Kiribayashi | B60R 21/01556 180/271 |
| 2017/0043783 A1* | 2/2017 | Shaw | B60N 2/28 |
| 2017/0116839 A1* | 4/2017 | Friedman | B60N 2/26 |
| 2017/0323549 A1* | 11/2017 | Copulos | G08B 21/24 |
| 2018/0188061 A1* | 7/2018 | Yamamoto | B60N 2/26 |
| 2018/0251122 A1* | 9/2018 | Golston | B60W 50/0098 |
| 2019/0337523 A1 | 11/2019 | Rogness et al. | |
| 2020/0290567 A1* | 9/2020 | Funyak | B60R 25/31 |
| 2020/0398699 A1* | 12/2020 | Tsuchiya | G06K 9/00838 |
| 2021/0061301 A1* | 3/2021 | Denthumdas | B60Q 3/16 |

FOREIGN PATENT DOCUMENTS

| | | |
|---|---|---|
| CN | 208248012 U | 12/2018 |
| KR | 20160066763 A | 6/2016 |

\* cited by examiner

SYSTEMS AND METHODS FOR DETERMINING THE PRESENCE OF OCCUPANTS LEFT BEHIND IN A VEHICLE

TECHNICAL FIELD

The present disclosure generally relates to vehicle sensing systems and, more specifically, to systems that detect the presence of occupants left behind in a vehicle after the vehicle has been turned off and a driver of the vehicle has left the vicinity of the vehicle.

BACKGROUND

Vehicle drivers can become distracted upon reaching a destination and may leave the vehicle in haste, and may inadvertently leave an occupant (e.g., a child, a pet, or the like) behind in a vehicle, particularly occupants in a rear seat of the vehicle. This may potentially be a dangerous situation, particularly in instances where temperatures in the vehicle may rise or lower to unsafe conditions (e.g., hot car or cold car conditions). Existing sensors are disposed in vehicle seats to detect the presence of occupants (e.g., weight or pressure sensors disposed in vehicle seats). However, the addition of such sensors can add to the overall weight of the vehicle, can increase the overall cost to manufacture the vehicle, and are not effective in detecting the presence of occupants that may not be in the seats or are moving around.

SUMMARY

In one aspect, a vehicle sensing system includes one or more vehicle sensors disposed on a vehicle to detect a ride height of the vehicle or a camber positioning of one or more wheels of the vehicle, a processing device communicatively coupled to the one or more vehicle sensors, and a non-transitory, processor readable storage medium communicatively coupled to the processing device. The non-transitory, processor readable storage medium includes one or more programming instructions stored thereon that, when executed, cause the processing device to obtain a first string of data from the one or more vehicle sensors before a driver has entered the vehicle and before the vehicle has been turned on, obtain a second string of data from the one or more vehicle sensors after the vehicle has moved a distance, the vehicle has been turned off, and the driver has departed from a vicinity of the vehicle, compare the first string of data to the second string of data to determine if a difference exists between the first string of data and the second string of data, and when the difference exists between the first string of data and the second string of data, transmit an alert to one or more external devices. The alert indicates a potential occupant being left behind in the vehicle.

In another aspect, method of sensing a potential presence of an occupant left behind in a vehicle includes obtaining, by a processing device, a first string of data from one or more vehicle sensors before a driver has entered the vehicle and before the vehicle has been turned on, the one or more vehicle sensors communicatively coupled to the processing device, obtaining, by the processing device, a second string of data from the one or more vehicle sensors after the vehicle has moved a distance, the vehicle has been turned off, and the driver has departed from a vicinity of the vehicle, comparing, by the processing device, the first string of data to the second string of data to determine if a difference exists between the first string of data and the second string of data, and when the difference exists between the first string of data and the second string of data, transmitting an alert to one or more external devices, the alert indicating a potential occupant being left behind in the vehicle.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The systems and methods described herein generally utilize various vehicle sensors, particularly existing sensors, to detect the presence of occupants left behind in a vehicle and transmit an alert accordingly. The various sensors that may be utilized by the systems and methods described herein include, but are not limited to, distance sensors arranged on an underside of the vehicle to detect ride height, sensors integrated with or coupled to a suspension of the vehicle to detect ride height, sensors integrated with or coupled to an interface of the vehicle's control arms with the wheels to detect a vehicle camber, and/or the like. The data received by such sensors is used to determine a change in characteristics (e.g., ride height, camber, and/or the like) from when the vehicle was in operation to when the vehicle has been turned off and the absence of the driver is detected, which may be indicative of the presence of an occupant remaining in the vehicle, including occupants that are not seated in seats that have occupant sensors. The data may also be used to determine gyrations, which may also be indicative of the presence of an occupant remaining in the vehicle (e.g., a pet pacing back and forth in the vehicle). The systems and methods are configured to transmit an alert to notify individuals (e.g., the driver, a third party, and/or the like) of the potential presence. The systems and methods described herein may be particularly applicable in hot car or cold car situations, as described in greater detail herein.

An "occupant" as used herein generally refers to any person, animal (e.g., pet), or the like in a vehicle. Occupants may be anywhere in the passenger compartment and/or a cargo compartment, particularly in vehicles where the cargo compartment is an extension of the passenger compartment, such as SUVs, vans, or the like. For example, a pet such as a dog or the like may be placed in the cargo compartment of an SUV behind the rear seats. The systems and methods described herein account for this placement of occupants and can be used to determine the likelihood of an occupant being left behind without using seat based sensing.

Figure 1:
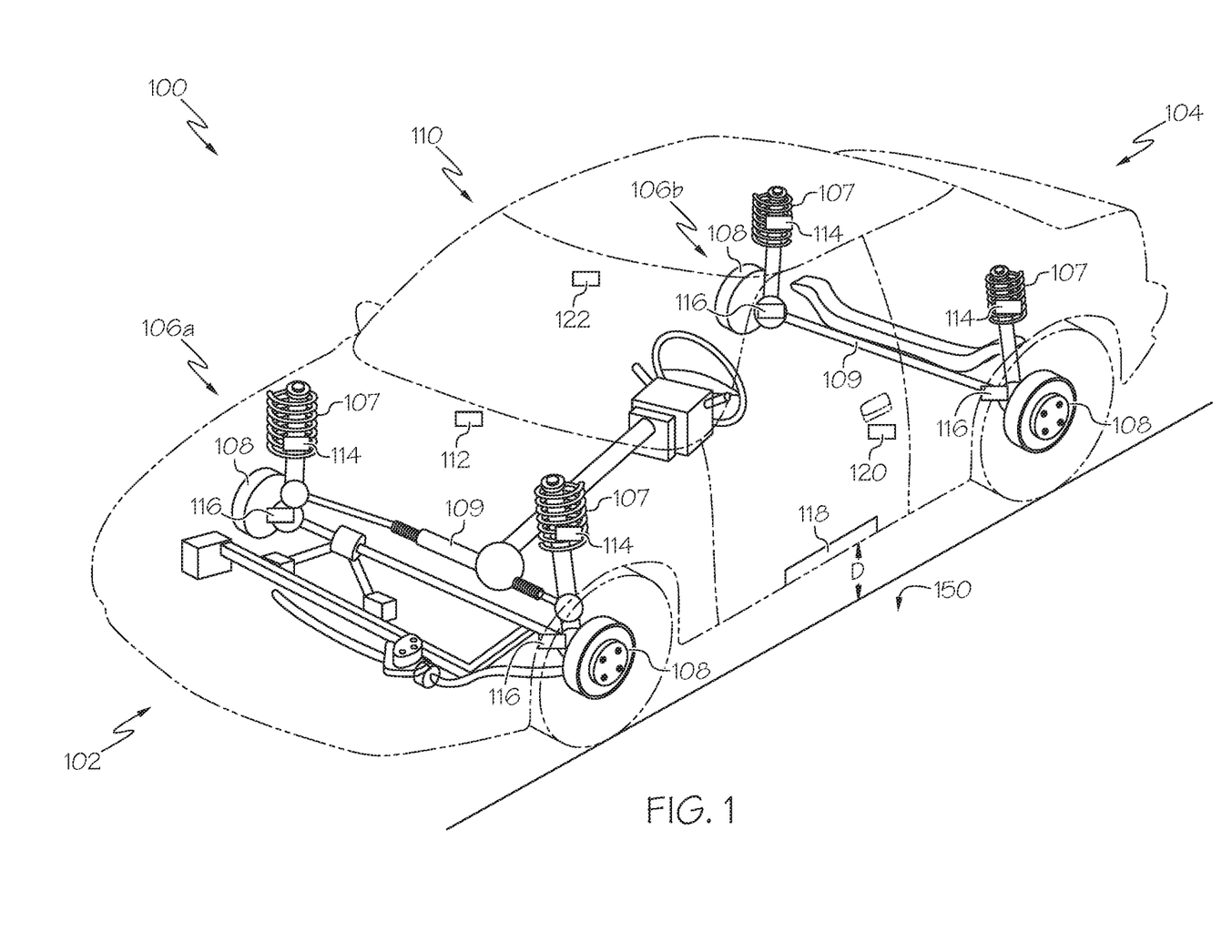
FIG. 1 schematically depicts an illustrative occupancy sensing system for detecting the presence of vehicle occupants left behind in a vehicle according to one or more embodiments shown and described herein.

Referring to FIG. 1, a vehicle 100 (depicted in phantom) generally includes a vehicle sensing system 110 that detects a potential presence of an occupant within the vehicle after a driver of the vehicle 100 has departed from a vicinity of the vehicle. FIG. 1 depicts the vehicle sensing system 110 as including a controller 112 and one or more vehicle sensors disposed on the vehicle 100 to sense various vehicle characteristics, such as, for example, a ride height of the vehicle 100, a camber positioning, one or more fluid levels, temperature (including temperatures inside and outside the vehicle 100), as described in greater detail herein.

The vehicle 100 generally includes, among other components, a front suspension 106a disposed towards a front 102 of the vehicle 100 and a rear suspension 106b disposed towards a rear 104 of the vehicle 100. Both the front suspension 106a and the rear suspension 106b include struts 107, wheels 108, and one or more linkage components 109 disposed between the wheels 108. The various components of the front suspension 106a and the rear suspension 106b (including components not specifically described herein) should generally be understood and are not described in further detail herein.

As noted above, the vehicle sensing system 110 of the vehicle 100 may include a plurality of sensors. Illustrative sensors include, but are not limited to, one or more suspension sensors 114, one or more angle sensors 116, one or more distance sensors 118, one or more fluid level sensors 120, and/or one or more temperature sensors 122. Each of the various sensors (e.g., the one or more suspension sensors 114, the one or more angle sensors 116, the one or more distance sensors 118, the one or more fluid level sensors 120, and/or the one or more temperature sensors 122) may be communicatively coupled to the controller 112 such that signals and/or data from each of the sensors is transmitted to the controller 112 for determination of vehicle occupants, as described in greater detail herein.

The one or more suspension sensors 114 are generally any type of sensor disposed on or around various suspension components of the front suspension 106a and/or the rear suspension 106b of the vehicle 100. For example, the one or more suspension sensors 114 may be coupled across dampers, coupled to a rocker arm, coupled to a control arm, coupled to a strut assembly, coupled internally within hydraulic actuators or pneumatic actuators (e.g., in active suspension systems), and/or the like. In particular embodiments, the one or more suspension sensors 114 may be devices, components, or the like that can be used to measure movement of the front suspension 106a and/or the rear suspension 106b of the vehicle 100. Illustrative examples of such suspension sensors 114 include, but are not limited to, linear potentiometers, rotary potentiometers, wire potentiometers, AC/DC LVDT (linear variable differential transformer) sensors, Hall-effect sensors (e.g., magnetic Hall contactless rotary position sensors and/or magnetic Hall contactless linear position sensors). In some embodiments, the one or more suspension sensors 114 may utilize optical sensors and/or light emitters (e.g., laser emitters) to sense movement of the front suspension 106a, movement of the rear suspension 106b, and/or measure a distance between objects. Other examples of suspension sensors 114 not specifically described herein should generally be understood. The one or more suspension sensors 114 are generally configured to collect data regarding the front suspension 106a and/or the rear suspension 106b and transmit the data as suspension data to the controller 112, as described in greater detail herein. In some instances, the one or more suspension sensors 114 may be referred to as ride height sensors. As will be described herein, the data provided by the one or more suspension sensors 114 may be indicative of an amount of deflection of the front suspension 106a and/or the rear suspension 106b, which can be correlated to a detected potential presence of an occupant remaining in the vehicle 100.

The one or more angle sensors 116 are generally any type of sensor disposed at joint between the wheels 108 and one or more components of the suspensions 106a, 106b of the vehicle 100, such as, for example, a joint between the wheels 108 and the linkage components 109 of the vehicle 100. The one or more angle sensors 116 may generally be disposed at such locations to measure a camber angle of the wheels 108 of the vehicle 100, as a camber angle can be used as an indicator of a potential presence of an occupant remaining in the vehicle 100, as described in greater detail herein. Illustrative examples of angle sensors 116 include, but are not limited to, capacitance sensors, eddy current sensors, photoelectric sensors, ultrasonic sensors, inductive sensors, Hall-effect sensors, magnetoresistive sensors, magnetorestrictive sensors, and variable reluctance sensors. Other examples of angle sensors 116 not specifically described herein should generally be understood. The one or more angle sensors 116 may be contact sensors or non-contact sensors in various embodiments. The one or more angle sensors 116 are generally configured to collect data regarding the camber angle and transmit the data as camber data to the controller 112, as described in greater detail herein.

The one or more distance sensors 118 are generally any type of sensor disposed on the vehicle 100, particularly the underside of the vehicle 100, to measure a distance D from a particular portion of the vehicle 100 where the one or more distance sensors 118 are coupled to a ground surface 150. For example, as depicted in FIG. 1, the one or more distance sensors 118 may be positioned on a rocker panel of the vehicle 100 to measure the distance D from the rocker panel to the ground surface 150, as a change in the distance D may be used as an indicator of a potential presence of an occupant remaining in the vehicle 100, as described in greater detail herein. The one or more distance sensors 118 may be sound-based distance sensors or light-based distance sensors. In some embodiments, the one or more distance sensors 118 may include both emitter and receiver components. Illustrative examples of distance sensors 118 include, but are not limited to, ultrasonic sensors, sonar sensors, radar sensors, lidar sensors, infrared (IR) sensors, and/or the like. Other examples of distance sensors 118 not specifically described herein should generally be understood. The one or more distance sensors 118 may be contact sensors in some embodiments. The one or more distance sensors 118 are generally configured to collect data regarding the distance D and transmit the data as distance data to the controller 112, as described in greater detail herein.

While FIG. 1 depicts the one or more suspension sensors 114, the one or more angle sensors 116, and the one or more distance sensors 118 as being components that are separate from one another, the present disclosure is not limited to such. That is, in some embodiments, the one or more suspension sensors 114, the one or more angle sensors 116, and/or the one or more distance sensors 118 may be combined into one or more sensing units that are positioned and capable of sensing suspension deflection, camber angle, and/or distance, and transmitting data to the controller 112 for the purposes of determining a detected potential presence of an occupant remaining in the vehicle 100, as described herein.

The one or more fluid level sensors 120 are generally any type of sensor disposed in or around a fluid tank of the vehicle 100, particularly fluid tanks containing fluid that may be used, consumed, lost, or the like during operation of the vehicle 100. For example, the one or more fluid level sensors 120 may be disposed to measure fluid such as fuel, washer fluid, oil, brake fluid, coolant or radiator fluid, transmission fluid, power steering fluid, air conditioning coolant, or the like. Illustrative examples of the one or more fluid level sensors 120 include, but are not limited to, floats; hydrostatic devices such as displacers, bubblers, differential pressure transmitters, load cells, magnetic level gauges, and capacitance transmitters; magnetorestrictive level transmitters, ultrasonic level transmitters, laser level transmitters, radar level transmitters, and/or the like. Other examples of fluid level sensors 120 not specifically described herein should generally be understood. The one or more fluid level sensors 120 may be contact sensors or non-contact sensors in various embodiments. The one or more fluid level sensors 120 are generally configured to collect data regarding the fluid level and transmit the data as fluid level data to the controller 112, as described in greater detail herein.

The one or more temperature sensors 122 are generally any type of sensor disposed in the cabin of the vehicle 100 and/or in an exterior environment surrounding the vehicle 100. The one or more temperature sensors 122 generally measure a temperature of an area in which the one or more temperature sensors 122 are disposed (e.g., within the cabin of the vehicle 100 and/or an environment in which the vehicle 100 is located). Illustrative temperature sensors 122 should generally be understood. The one or more temperature sensors 122 are generally configured to collect data regarding the temperature within the cabin of the vehicle 100 and/or in the environment surrounding the vehicle 100 and transmit the data as temperature data (e.g., interior temperature data and/or exterior temperature data) to the controller 112, as described in greater detail herein. In some embodiments, the one or more temperature sensors 122 may be a temperature sensor that is disposed separately from the vehicle 100 and transmits temperature data to the controller 112 (e.g., weather monitoring temperature sensors that collect temperature data for a particular area).

One or more of the various sensors of the vehicle sensing system 110 described herein (e.g., the one or more suspension sensors 114, the one or more angle sensors 116, the one or more distance sensors 118, the one or more fluid level sensors 120, the one or more temperature sensors 122) may be existing vehicle sensors in some embodiments. That is, one or more of the various sensors of the vehicle sensing system 110 described herein may be sensors that are typically installed on a vehicle for other purposes, but the data provided by such sensors is used for the purposes of determining a detected potential presence of an occupant remaining in the vehicle 100, as described herein. In other embodiments, one or more of the various sensors of the vehicle sensing system 110 described herein may be installed on the vehicle 100 solely for the purposes of providing data that is used for the purposes of determining a detected potential presence of an occupant remaining in the vehicle 100 as described herein.

Figure 2:
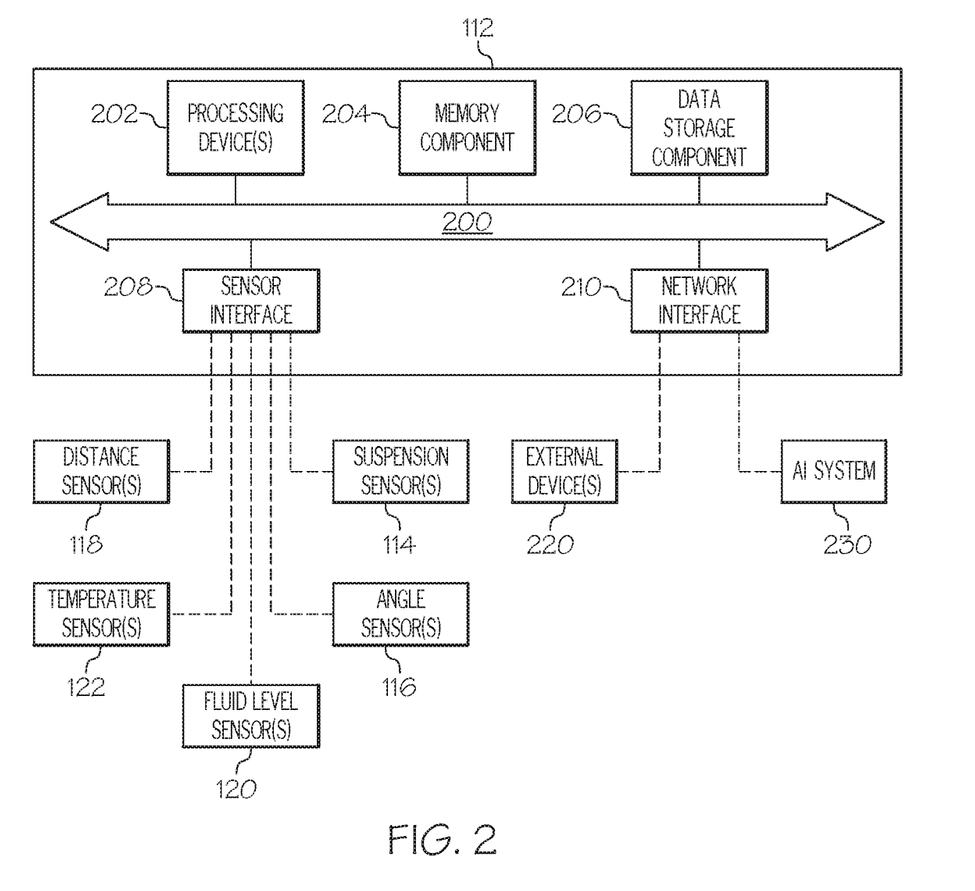
FIG. 2 depicts a block diagram of illustrative hardware components of an occupancy sensing system according to one or more embodiments shown and described herein.

As noted above, the controller 112 is communicatively coupled to the various sensors such that signals and/or data from each of the sensors is transmitted to the controller 112 for determination of vehicle occupants. The controller 112 includes a plurality of hardware components that particularly function to determine vehicle occupants as described herein. FIG. 2 depicts illustrative hardware components of the controller 112.

A local interface 200 may interconnect the various components of the controller 112. The local interface 200 may be formed from any medium that is capable of transmitting a signal such as, for example, conductive wires, conductive traces, optical waveguides, or the like. Further, the local interface 200 may be formed from a combination of mediums capable of transmitting signals. In one embodiment, the local interface 200 includes a combination of conductive traces, conductive wires, connectors, and buses that cooperate to permit the transmission of electrical data signals to components such as processors, memories, sensors, input devices, output devices, and communication devices. Accordingly, the local interface 200 may include a bus, such as a controller area network (CAN) bus, a local interconnect network (LIN), and/or the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The local interface 200 communicatively couples the various components of the controller 112.

One or more processing devices 202, such as a computer processing unit (CPU), may be the central processing unit(s) of the controller 112, performing calculations and logic operations required to execute a program. Each of the one or more processing devices 202, alone or in conjunction with one or more of the other elements disclosed in FIG. 2, is an illustrative processing device, computing device, processor, or combination thereof, as such terms are used within this disclosure. Accordingly, each of the one or more processing devices 202 may be a controller, an integrated circuit, a microchip, a computer, or any other computing device. The one or more processing devices 202 are communicatively coupled to the other components of the controller 112 by the local interface 200.

One or more memory components 204 configured as volatile and/or nonvolatile memory, such as read only memory (ROM) and random access memory (RAM; e.g., including SRAM, DRAM, and/or other types of RAM), flash memories, hard drives, secure digital (SD) memory, registers, compact discs (CD), digital versatile discs (DVD), Blu-ray™ discs, or any non-transitory memory device capable of storing machine-readable instructions may constitute illustrative memory devices (i.e., non-transitory processor-readable storage media) that is accessible by the one or more processing devices 202. Such memory components 204 may include one or more programming instructions thereon that, when executed by the one or more processing devices 202, cause the one or more processing devices 202 to complete various processes, such as the processes described herein. Depending on the particular embodiment, these non-transitory computer-readable mediums may reside within the controller 112 and/or external to the controller 112. A machine-readable instruction set may include logic or algorithm(s) written in any programming language of any generation (e.g., 1GL, 2GL, 3GL, 4GL, or 5GL) such as, for example, machine language that may be directly executed by the one or more processing devices 202, or assembly language, object-oriented programming (OOP), scripting languages, microcode, and/or the like that may be compiled or assembled into machine-readable instructions and stored in the non-transitory computer readable memory (e.g., the memory components 204). Alternatively, a machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

In some embodiments, the program instructions contained on the one or more memory components 204 may be embodied as a plurality of software modules, where each module provides programming instructions for completing one or more tasks. For example, the one or more memory components 204 may contain one or more of operating logic, data obtaining logic, fluid consumption determination logic, comparison logic, temperature logic, alert generation logic, alert transmission logic, user interface logic, and/or the like. The operating logic may include an operating system and/or other software for managing components of the controller 112. The data obtaining logic may include programming instructions or the like for obtaining data from one or more sensors (e.g., the one or more suspension sensors 114, the one or more angle sensors 116, the one or more distance sensors 118, the one or more fluid level sensors 120, and/or the one or more temperature sensors 122). The fluid consumption determination logic may include programming instructions for determining an amount of fluid that is consumed during operation of the vehicle 100 (FIG. 1), including a weight of the fluid that is consumed. The comparison logic may generally include programming instructions for comparing data strings that are received at particular times, as described in greater detail herein. The temperature logic generally includes one or more programming instructions for determining a temperature inside or outside a cabin of the vehicle 100 (FIG. 1) and comparing the temperature to a temperature threshold. The alert generation logic may generally include programming instructions for generating an alert if data indicates a potential occupant remaining in the vehicle 100 (FIG. 1), as described in greater detail herein. The alert transmission logic may generally include programming instructions for transmitting an alert to one or more external devices, as described in greater detail herein. The user interface logic may generally include one or more programming instructions for sending and/or receiving transmissions at a user interface.

The various logic modules described herein with respect to one or more memory components 204 of the controller 112 are merely illustrative, and that other logic modules, including logic modules that combine the functionality of two or more of the modules described hereinabove, may be used without departing from the scope of the present application. Furthermore, various logic modules that are specific to other systems, devices, and/or components of the vehicle 100 of FIG. 1 are also contemplated.

Still referring to FIG. 2, one or more data storage components 206, which may each generally be a storage medium that is separate from the one or more memory components 204, may contain a data repository for storing data that is used for storing electronic data and/or the like relating to various data generated, captured, and/or the like, as described herein. The one or more data storage components 206 may be any physical storage medium, including, but not limited to, a hard disk drive (HDD), memory, removable storage, and/or the like. While the one or more data storage components 206 are depicted as local devices, it should be understood that at least one of the one or more data storage components 206 may be a remote storage device, such as, for example, a server computing device or the like in some embodiments.

Illustrative data stored within the one or more data storage components 206 may include, for example, the suspension data that is generated and/or transmitted by the one or more suspension sensors 114, the camber data that is generated and/or transmitted by the one or more angle sensors 116, the distance data that is generated and/or transmitted by the distance sensors 118, the fluid level data that is generated and/or transmitted by the one or more fluid level sensors 120, and/or the temperature data that is generated and/or transmitted by the one or more temperature sensors 122. The types of data described herein with respect to one or more data storage components 206 of the controller 112 are merely illustrative, and other types of data may be used without departing from the scope of the present application. Furthermore, various types of data that are specific to other systems, devices, and/or components of the vehicle 100 of FIG. 1 (e.g., data pertaining to a distance driven, an amount of time the vehicle 100 (FIG. 1) is turned on, and/or the like) are also contemplated.

Sensor interface hardware 208 may generally provide the controller 112 with an ability to interface with the one or more sensors (e.g., the one or more suspension sensors 114, the one or more angle sensors 116, the one or more distance sensors 118, the one or more fluid level sensors 120, and/or the one or more temperature sensors 122). The sensor interface hardware 208 may include a direct interface as depicted in FIG. 2, or an indirect interface (e.g., communicatively coupled via a network or the like. Communication with such components may occur using various communication ports (not shown). An illustrative communication port may be attached to a communications network, such as an intranet, a local network, a direct connection, a vehicle bus (e.g., a CAN bus), and/or the like.

Network interface hardware 210 may generally provide the controller 112 with an ability to interface with one or more external components outside the vehicle 100 (FIG. 1), including one or more devices coupled to a network, via the Internet, via an intranet, or the like. For example, as depicted in FIG. 2, the network interface hardware 210 may interface with one or more external devices 220 for the purposes of transmitting an alert and/or receiving a response to the alert, such as, for example, a user's mobile device or cellular telephone, one or more emergency services devices (including mobile devices and computing devices), and/or the like. In another example, as depicted in FIG. 2, the network interface hardware 210 may interface with an artificial intelligence (AI) system 230 for the purposes of utilizing the AI system 230 to determine whether an occupant remains in the vehicle 100 (FIG. 1) based on the data that is received. Still referring to FIG. 2, communication with the external devices 220 and/or the AI system 230 may occur using various communication ports (not shown). An illustrative communication port may be attached to a communications network, such as the Internet, an intranet, a local network, a direct connection, and/or the like.

It should be understood that in some embodiments, the sensor interface hardware 208 and the network interface hardware 210 may be combined into a single device that allows for communications with other systems, devices, and/or components, regardless of location of such other systems, devices, and/or components.

It should be understood that the components illustrated in FIG. 2 are merely illustrative and are not intended to limit the scope of this disclosure. More specifically, while the components in FIG. 2 are illustrated as residing within the controller 112, these are nonlimiting examples. In some embodiments, one or more of the components may reside external to the controller 112. Similarly, one or more of the components may be embodied in other computing devices not specifically described herein.

In some embodiments, the systems, devices, and/or components described herein with respect to FIGS. 1 and 2 may incorporate components that are already installed on a vehicle for other purposes, but are also used for the purposes described herein, so as to not add additional weight or cost of manufacture. In other embodiments, the systems, devices, and/or components described herein with respect to FIGS. 1 and 2 may be components that are specifically installed on a vehicle to function as described herein. In some embodiments, the systems, devices, and/or components described herein may be installed and configured on the vehicle 100 during manufacture of the vehicle 100. In other embodiments, the systems, devices, and/or components described herein with respect to FIGS. 1 and 2 may be a kit of parts that is used to retrofit an existing vehicle to add the functionality described herein.

The systems, devices, and/or components described herein with respect to FIGS. 1 and 2 generally provide functionality for carrying out a plurality of processes for determining whether an occupant is potentially left behind within a vehicle after a driver has left the vicinity of the vehicle and the vehicle has been turned off, as described herein. The remaining description provided herein includes specific details with respect to such processes.

Figure 3:
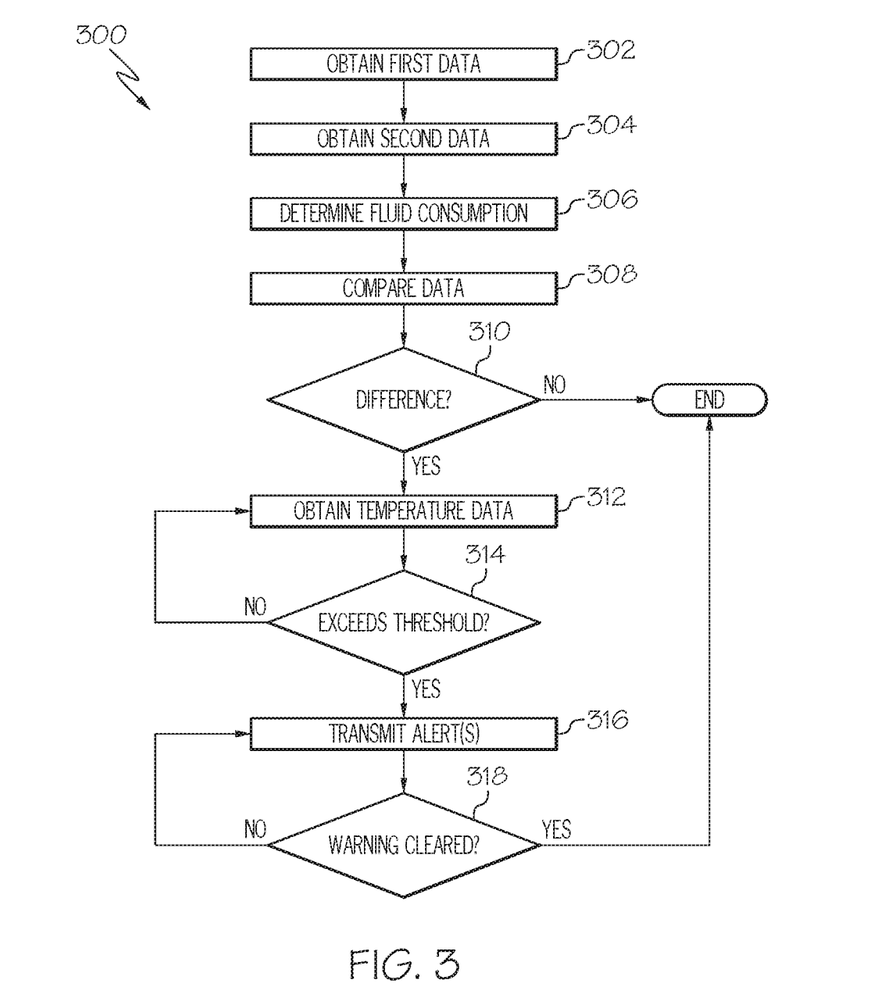
FIG. 3 depicts a flow diagram of an illustrative method of detecting the presence of occupants left behind in a vehicle and transmitting an alert according to one or more embodiments shown and described herein.

Turning now to FIG. 3, a method 300 of sensing a potential presence of an occupant let behind in a vehicle is depicted. The various steps of the method 300 may generally be completed by the components described hereinabove with respect to FIGS. 1 and 2, such as, for example, the one or more processing devices 202 depicted in FIG. 2 (which may operate based on programming instructions stored on the one or more memory components 204 depicted in FIG. 2).

Referring to FIGS. 1-3, the method 300 includes obtaining a first string of data at block 302. That is, the one or more processing devices 202 may query one or more of the sensors (e.g., the one or more suspension sensors 114, the one or more angle sensors 116, the one or more distance sensors 118, the one or more fluid level sensors 120, and/or the one or more temperature sensors 122) and receive sensor data from the one or more of the sensors (e.g., suspension data, camber data, distance data, fluid level data, temperature data, and/or the like). In some embodiments, the first string of data may be received before a driver of a vehicle 100 has entered the vehicle 100 and/or before the vehicle 100 has been turned on. That is, the one or more processing devices 202 may receive a continuous stream of data or periodically receive data at a predetermined interval from the sensors described herein, store the data in the memory component 204 and/or the data storage component 206, and may access the recorded data that was received before detecting a driver entering the vehicle 100 and turning the vehicle 100 on (e.g., detecting an unlocking of the doors, an opening of the doors, presence of a driver in the driver's seat, operation of the ignition, and/or the like). In some embodiments, the one or more processing devices 202 may purge or delete data from the memory component 204 and/or the data storage component 206 if no driver is detected and/or the vehicle 100 is not turned on after a predetermined period of time after receiving data, upon receipt of subsequent data, or the like.

After the vehicle 100 has been driven a particular distance, the one or more processing devices 202 may obtain a second string of data at block 304. That is, the one or more processing devices 202 may query one or more of the sensors (e.g., the one or more suspension sensors 114, the one or more angle sensors 116, the one or more distance sensors 118, the one or more fluid level sensors 120, and/or the one or more temperature sensors 122) and receive sensor data from the one or more of the sensors (e.g., suspension data, camber data, distance data, fluid level data, temperature data, and/or the like). In some embodiments, the second string of data may be received after the vehicle 100 has moved a distance, the vehicle 100 has been turned off, and/or the driver has departed from a vicinity of the vehicle 100. That is, data from sensors that indicate a distance traveled, data regarding ignition status (e.g., on or off), and/or data from a transponder carried by the driver (e.g., a vehicle key, the driver's smartphone, or the like) may be used to determine the vehicle 100 has moved a distance, the vehicle 100 has been turned off, and/or the driver has departed from a vicinity of the vehicle 100. The second stream of data may be requested by the one or more processing devices 202 at the time it is detected that the vehicle 100 has traveled a distance, the vehicle 100 has been turned off and/or the driver has departed from the vehicle 100, or may be tagged from data that is transmitted at particular intervals.

At block 306, the one or more processing devices 202 may determine an amount of fluid consumption that occurred during the drive, which can be a factor in determining whether occupants remain in the vehicle 100. That is, consumed fluid such as fuel is burned by the vehicle 100 during operation, thus resulting in a fuel tank that is less full (and less heavy) at the end of a trip than it was at the beginning of the trip. Thus, the determination according to block 306 can be used to determine how much lighter the vehicle 100 should be without the fluid that was consumed.

At block 308, the one or more processing devices 202 compare the first string of data with the second string of data to determine if a difference exists between the two at block 310. Such a comparison may factor in the amount of fluid consumption as determined in block 306. That is, a difference may be calculated between the first string of data and the second string of data and the lighter weight of the vehicle 100 is used as a factor in determining the difference. If there is no difference between the first string of data and the second string of data (with the fluid consumption factored in or without the fluid consumption factored in if not determined), the process may end. If there is a difference between the first string of data and the second string of data, the process may proceed to block 312. In some embodiments, such a comparison according to block 308 and determination according to block 310 may be a basic comparison where any difference is determined (e.g., any change in ride height, any change in suspension parameters, any change in camber angle, a plurality of changes that indicates gyrations, or the like). In other embodiments, such a comparison according to block 308 and determination according to block 310 may be a more complex determination that can be used to account for objects left behind in a vehicle (as opposed to occupants). For example, the processes according to blocks 308 and 310 may be completed by the AI system 230 that executes a machine learning algorithm trained on a model to recognize the presence of occupants in the vehicle 100 based on data provided. In such an example, the data is transmitted to the AI system 230 where it is analyzed, a determination is made, and a transmission back to the vehicle 100 (e.g., to the one or more processing devices 202) is completed, the transmission indicating a determination of a "YES" or "NO" answer at block 310.

At block 312, the one or more processing devices 202 may obtain temperature data from the one or more temperature sensors 122. The temperature data may include one or both of internal vehicle cabin temperature and external temperature. The obtained temperature is utilized at block 314 to determine whether it exceeds a threshold. The threshold is generally some predetermined temperature that is indicative of a "hot car" or a "cold car" situation whereby the temperature of the cabin is dangerous to occupants remaining in the vehicle 100. That is, threshold may be exceeded in a "hot car" situation when an ambient temperature outside the vehicle 100 is greater than about 21° C., when a cabin temperature of the vehicle 100 is greater than about 26° C., and/or the like. The threshold may also be exceeded in a "cold car" situation when an ambient temperature outside the vehicle 100 is less than about 0° C., when a cabin temperature of the vehicle 100 is less than about 2° C., and/or the like. It should be understood that the temperatures provided herein are illustrative, and that the threshold may be set for "hot car" and "cold car" scenarios based on thresholds promulgated by governing authorities, thresholds determined by manufacturers or associations, thresholds set by a vehicle driver, and/or the like. If the temperature does not exceed the threshold (e.g., is not below a "cold car" threshold or not above a "hot car" threshold), the process may return to block 312 for further monitoring). If the temperature exceeds the threshold (e.g., is below a "cold car" threshold or above a "hot car" threshold), the process may proceed to block 316.

In some embodiments, the processes completed according to blocks 312 and 314 may be based on vehicle cabin temperatures only (e.g., not ambient temperatures) to account for situations where a vehicle driver may intentionally leave occupants behind in the vehicle 100 with the vehicle air conditioning on, the vehicle heating on, or the like. In other embodiments, the process according to blocks 312 and 314 may be omitted such that the process proceeds from block 310 to block 316.

At block 316, one or more alerts may be transmitted. The alerts are not limited by the present disclosure, and may be any alert. For example, an alert may be transmitted to the driver's mobile device, indicating that an occupant may be remaining in the vehicle 100. In another example, an alert may be transmitted to the driver's transponder key, indicating that an occupant may be remaining in the vehicle 100. The alert may be an audible alert, a visual alert, a haptic alert, or some combination of the foregoing. In some embodiments, the alert may be transmitted to others, such as emergency service providers, a vehicle owner, a rideshare provider, or the like.

In some embodiments, the alert may be transmitted a single time and the process may end. In other embodiments, the alert may be transmitted at a particular interval or continuously until the warning is cleared, such as by actuation of a button or other user interface device requesting the warning be cleared, by sensing that the driver has returned to the vehicle 100, by sensing a vehicle door has been opened, by sensing the ignition has been turned on, and/or the like. As such, a decision may be made at block 318 as to whether the warning has been cleared. If the warning is cleared, the process may end. If the warning is not cleared, the process may return to block 316.

It should now be understood that the systems and methods described herein determine the potential presence of an occupant left behind in a vehicle after the vehicle has been turned off and the driver of the vehicle has left the vicinity of the vehicle using sensors that do not include seat-based sensors. It should further be understood that such a determination of the potential presence of an occupant left behind in a vehicle utilize sensors that sense a change in ride height and/or a camber positioning of the vehicle wheels. It should also be understood that if the senor data indicates a potential occupant has been left behind, an alert is transmitted to the driver of the vehicle and/or a third party, particularly in hot car or cold car situations where the vehicle cabin temperature has increased above a particular threshold.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle sensing system, comprising:
one or more vehicle sensors disposed on a vehicle to detect a ride height of the vehicle or a camber positioning of one or more wheels of the vehicle;
a processing device communicatively coupled to the one or more vehicle sensors and configured to:
obtain a first string of data from the sensors before a driver has entered the vehicle and before the vehicle has been turned on,
obtain a second string of data from the sensors after the vehicle has moved a distance, has been turned off, and the driver has departed from a vicinity of the vehicle,
compare the first string to the second string to determine if a difference exists between the first string and the second string, and
when the difference exists, transmit an alert to one or more external devices that indicates a potential occupant being left behind in the vehicle.

2. The vehicle sensing system of claim 1, further comprising one or more cabin temperature sensors communicatively coupled to the processing device.

3. The vehicle sensing system of claim 2, wherein the processing device is further configured to:
determine a cabin temperature of the vehicle from data received from the one or more cabin temperature sensors, and
transmit the alert if the difference exists between the first string of data and the second string of data and if the cabin temperature exceeds a predetermined threshold.

4. The vehicle sensing system of claim 1, wherein the processing device is further configured to:
determine an amount of fluid consumed by the vehicle to move the distance.

5. The vehicle sensing system of claim 4, wherein comparing the first string of data to the second string of data comprises determining an amount of difference caused by the amount of fluid consumed by the vehicle and include the amount of difference caused by the amount of fluid consumed when comparing.

6. The vehicle sensing system of claim 1, wherein the processing device is further configured to:
determine whether the second string of data indicates gyrations in ride height, and when the second string of data indicates gyrations in ride height, transmit the alert to the one or more external devices.

7. The vehicle sensing system of claim 1, wherein the one or more vehicle sensors comprise one or more suspension compression sensors disposed within or coupled to a vehicle suspension of the vehicle.

8. The vehicle sensing system of claim 1, wherein the one or more vehicle sensors comprise one or more distance sensors mounted to an underside of the vehicle, the one or more distance sensors arranged to sense a distance between the underside of the vehicle and a ground surface.

9. The vehicle sensing system of claim 1, wherein the one or more vehicle sensors comprise one or more angle sensors disposed at an intersection of a control arm and a wheel of the vehicle, the one or more angle sensors configured to detect a camber of the vehicle.

10. A method of sensing a potential presence of an occupant left behind in a vehicle, the method comprising:

- obtaining a first string of data from one or more vehicle sensors before a driver has entered the vehicle and before the vehicle has been turned on, the one or more vehicle sensors disposed on the vehicle to detect a ride height of the vehicle or a camber positioning of one or more wheels of the vehicle;
- obtaining a second string of data from the one or more vehicle sensors after the vehicle has moved a distance, the vehicle has been turned off, and the driver has departed from a vicinity of the vehicle;
- comparing the first string to the second string to determine if a difference exists between the first string and the second string; and
- when the difference exists, transmitting an alert to one or more external devices that indicates a potential occupant being left behind in the vehicle.

* * * * *

UNITED STATES PATENT AND TRADEMARK OFFICE
CERTIFICATE OF CORRECTION

PATENT NO. : 11,241,977 B1  
APPLICATION NO. : 17/068276  
DATED : February 8, 2022  
INVENTOR(S) : Wiesenberg et al.

Page 1 of 1

It is certified that error appears in the above-identified patent and that said Letters Patent is hereby corrected as shown below:

On the Title Page

Column 2, item (56), U.S. Patent Documents, cite No. 3, delete "O' Amato et al." and insert --D' Amato et al.--, therefor.

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*